United States Patent

[11] 3,545,508

[72] Inventor: Myron D. Tupper, Portland, Oregon
[21] Appl. No.: 702,870
[22] Filed: Feb. 5, 1968
[45] Patented: Dec. 8, 1970
[73] Assignee: Omark Industries, Inc. Portland, Oregon a corporation of Oregon

[54] DUAL ELEMENT TOP SHARPENING SAW CHAINS
24 Claims, 14 Drawing Figs.

[52] U.S. Cl. .................................................. 143/135
[51] Int. Cl. ................................................ B27b 33/14
[50] Field of Search .......................................... 143/135, 32; 76/25(A), 37, 38

[56] References Cited
UNITED STATES PATENTS

| | | | |
|---|---|---|---|
| 2,642,102 | 6/1953 | Dunnington | 143/135 |
| 3,189,064 | 6/1965 | Frederickson | 143/135 |
| 3,260,287 | 7/1966 | Oehrli | 143/32 |
| 3,263,717 | 8/1966 | Silvon | 143/135 |

Primary Examiner—Donald R. Schran
Attorney—Buckhorn, Blore, Klarquist and Sparkman ABSTRACT: Right-handed and left-handed dual element, top sharpening cutter links 11 and 12 (FIGS. 1 to 6) of a top sharpening saw chain 10 each includes a forwardly positioned depth gage 14, a thinned, centrally positioned side slitter 16 having a cutting edge 18 formed by a chromed, laterally outward face 20 and an unchromed, beveled edge 22, and a rearwardly positioned top plate 24 defining a raker and having a cutting edge 26 formed by a chromed forward face 28 and an unchromed, beveled, sharpening top edge surface 30, the face 28 and side edges 32 and 34 being chromed. A saw chain 70 (FIGS. 7 to 11) includes right-handed and left-handed cutter links 71 and 72 each having a thin side slitter 76 forming a continuation of a thicker depth gage 74 and also having a top plate 84 like the top plates 24. A saw chain 110 (FIGS. 12 to 14) includes cutter links 111 and 112 having depth gages 114 and side slitters 116, and also includes half-width raker, center slitter links 117 having depth gages 119, slitters 121 and top plates or rakers 124. Thin side links 125 having depth gages 127 and U-shaped wire links 129 staked at 131 complete the chain.

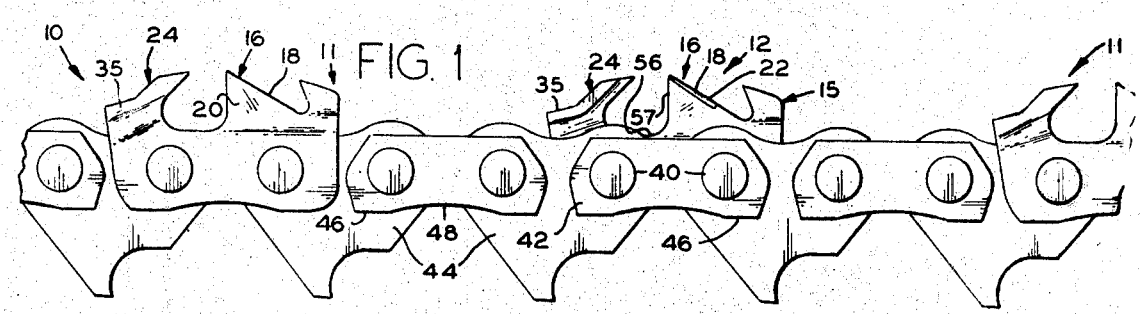
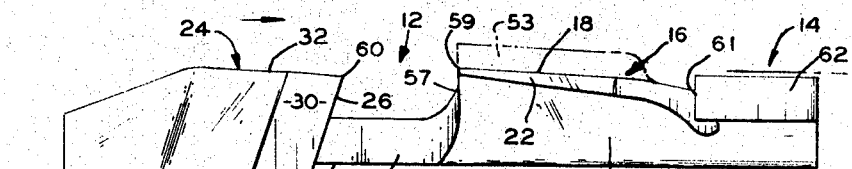
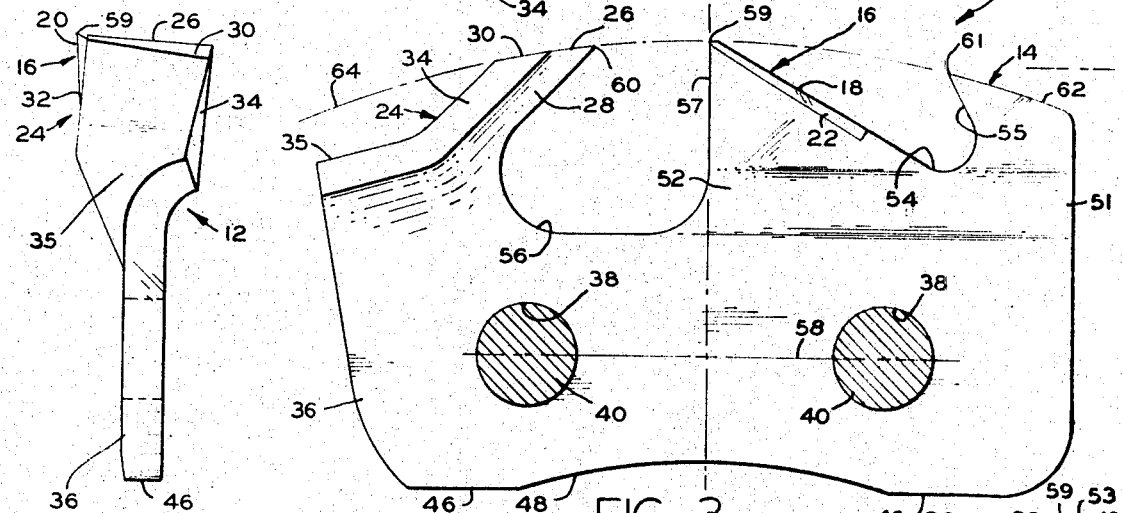
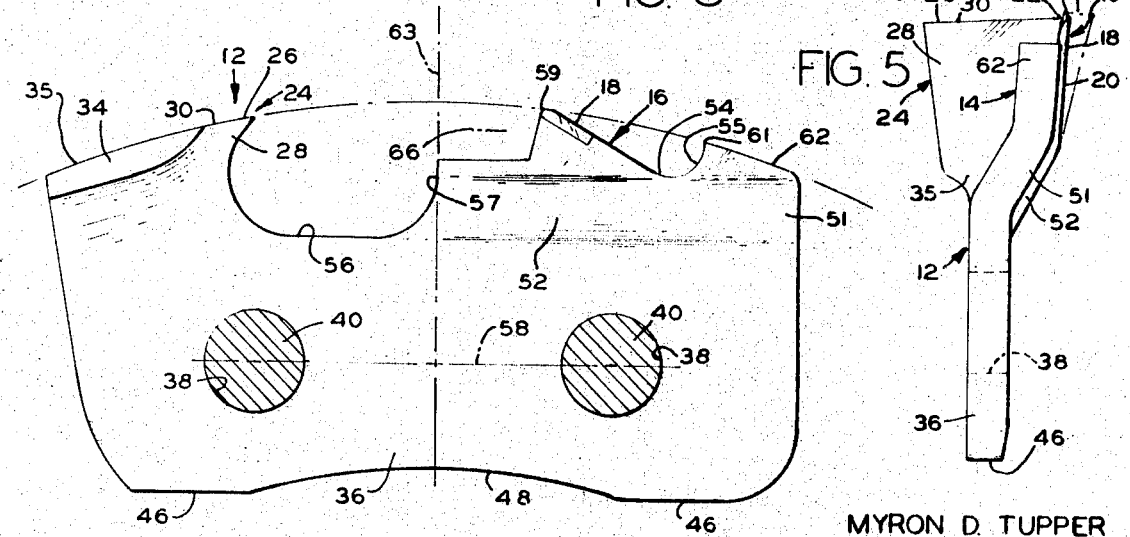

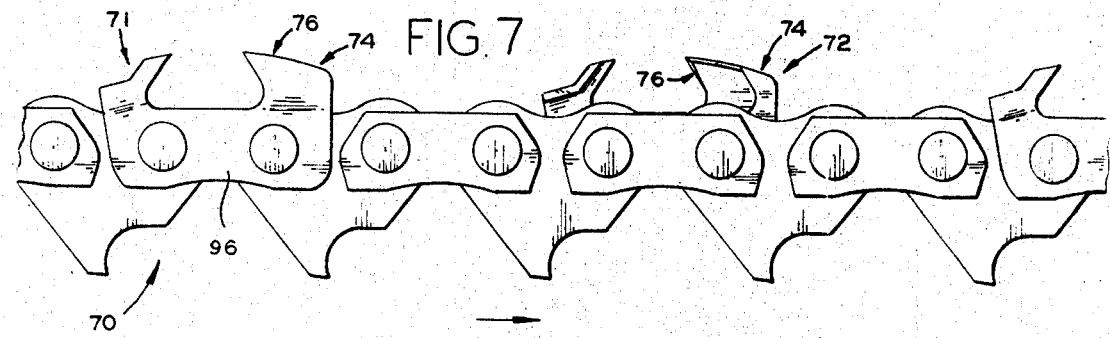
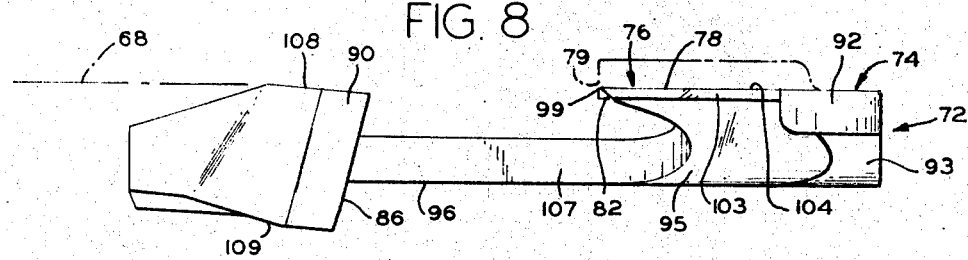
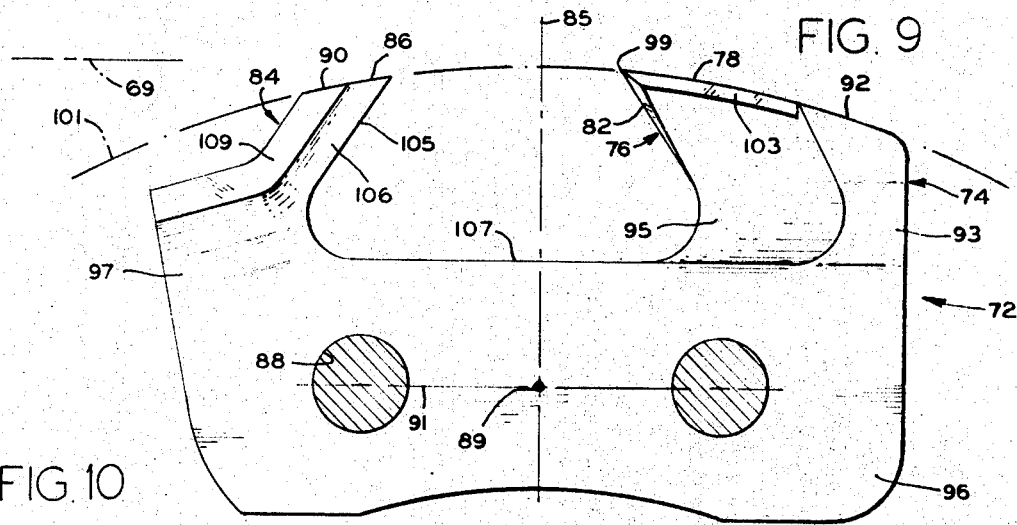
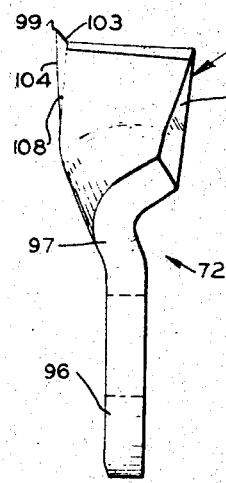
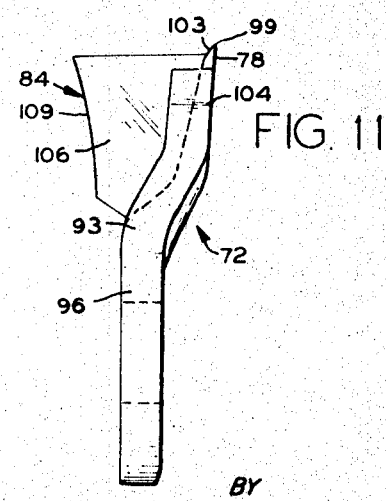

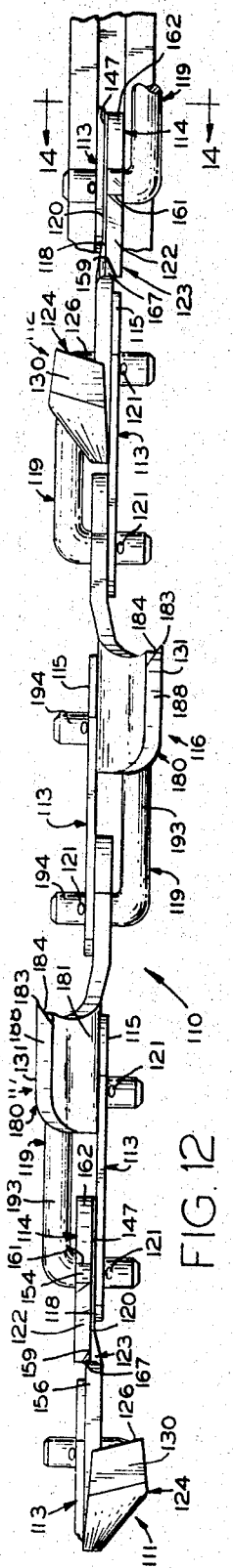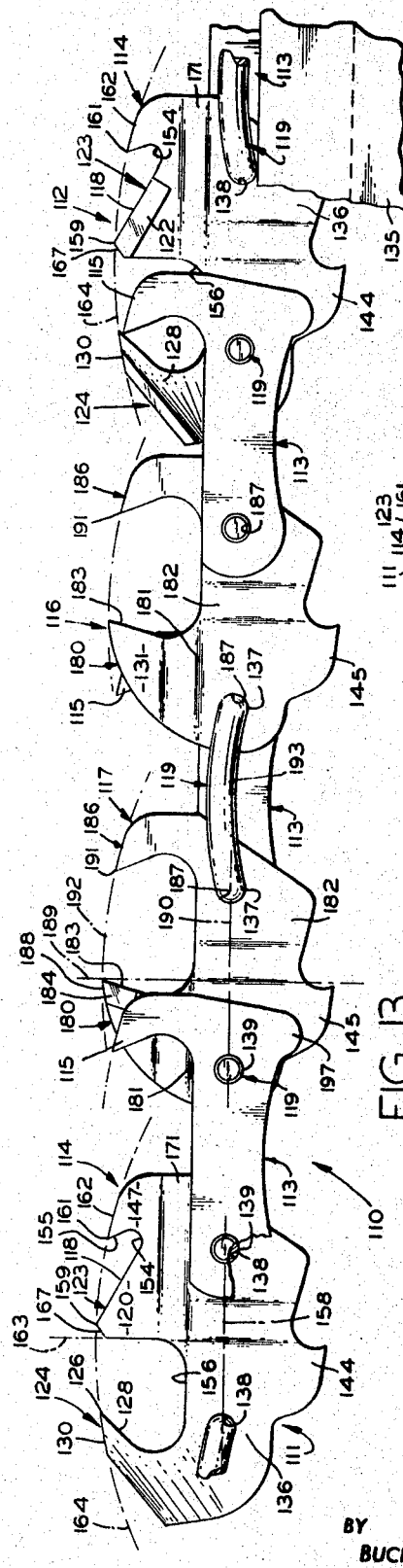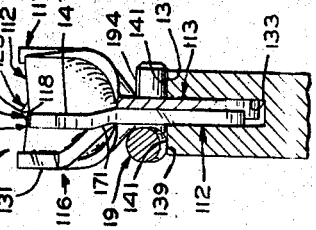

DUAL ELEMENT TOP SHARPENING SAW CHAINS

DESCRIPTION

This invention relates to dual element top sharpening saw chains, and more particularly to saw chains having separate slitters and rakers on the same links.

An object of the invention is to provide dual element top sharpening saw chains.

Another object of the invention is to provide saw chains having separate slitters and rakers on the same links.

A further object of the invention is to provide a top sharpening saw chain having a link provided with a forwardly positioned depth gage a central side slitter and a rearwardly positioned raker.

Another object of the invention is to provide a top sharpening saw chain having a link provided with a rearwardly positioned raker and a depth gage and a slitter continuous with the depth gage.

A further object of the invention is to provide a top sharpening saw chain having some links provided with center slitters and half rakers and other links provided with side slitters.

Another object of the invention is to provide a saw chain having a low profile and including U-shaped wire links connecting cutter links together.

The invention provides dual element top sharpening saw chains each having cutter links each provided with a slitter tooth separate from a raker tooth. Preferably the slitter tooth is thin and projecting further outwardly from the pitch line of the chain than the raker tooth. In a saw chain forming one specific embodiment of the invention, each cutter link includes a forwardly positioned depth gage separated by a gap from a side slitter tooth located between the depth gage and a rearwardly positioned top plate forming a raker. A cutter link of a saw chain forming an alternate embodiment of the invention has a thin side slitter tooth continuous with a thicker depth gage and spaced forwardly from a rearwardly positioned top plate forming a raker. Another saw chain forming an alternate embodiment of the invention may have some cutter links having center slitters and half rakers, other cutter links having side slitters, and U-shaped wire links and thin side plates joining the cutter links together.

In the drawings:

FIG. 1 is a top plan view of a dual element, top sharpening saw chain forming one embodiment of the invention;

FIG. 2 is an enlarged, top plan view of a cutter link of the saw chain of FIG. 1;

FIG. 3 is an enlarged, side elevation view of the cutter link of FIG. 2;

FIG. 4 is an enlarged, rear elevation view of the cutter link of FIG. 2;

FIG. 5 is an enlarged, front elevation view of the cutter link of FIG. 2;

FIG. 6 is an enlarged, side elevation view of the cutter link of FIG. 2 after many sharpenings;

FIG. 7 is a side elevation view of a dual element, top sharpening saw chain forming an alternate embodiment of the invention;

FIG. 8 is an enlarged, top plan view of a cutter link of the saw chain of FIG. 7;

FIG. 9 is an enlarged, side elevation view of the cutter link of FIG. 8;

FIG. 10 is an enlarged, rear elevation view of the cutter link of FIG. 8;

FIG. 11 is an enlarged, front elevation view of the cutter link of FIG. 8;

FIG. 12 is a top plan view of a dual element, top sharpening saw chain forming an alternate embodiment of the invention;

FIG. 13 is a side elevation view of the saw chain of FIG. 12; and

FIG. 14 is an enlarged, vertical sectional view taken along line 14–14 of FIG. 12.

Referring now in detail to the drawings, there is shown in FIGS. 1 to 6 a top sharpening saw chain 10 forming one embodiment of the invention and including allochiral, dual element, top sharpening, cutter links 11 and 12 each including a forwardly positioned depth gage 14, a thinned, centrally positioned, side slitter 16 having a cutting edge 18 formed by a chromed, laterally outward face 20 and an unchromed beveled edge 22, and a rearwardly positioned top plate or raker 24. The top plate is preferably inclined from 40° to about 60° to the pitch line of the saw chain and has a cutting edge 26 formed at the juncture of a chromed forward face 28 and an unchromed, beveled, sharpening, top edge surface 30. The face 28 and at least the lower portions of side edges 32 and 34 of the top plate are chromed while the link 12 is formed from sheet metal of, for example, cold rolled steel or stainless steel.

The top plate 24 forms a continuation of a twisted shank portion 35 joined to a body 36, which forms a side link of the saw chain. The top plate itself is slightly twisted but is substantially planar and lies approximately in a plane tilted slightly from the normal to the vertical plane in which the body 36 lies. The body includes rivet holes 38, and rivets 40 passing through the holes join the bodies 36, and side links 42 to center drive links 44. The bodies 36 and the side links 42 have bottom lands 46 adapted to bear on the outer edges of a saw bar (not shown) and also have arcuate central edge portions 48 adapted to bear against the circular periphery of a drive sprocket (not shown) of the chain saw.

The depth gage 14 (FIG. 5) and the side slitter 16 have laterally offsetting shank portions 51 and 52, respectively, and, in the manufacture of each of the links 11 and 12, a portion 53 is ground off before being chrome plated to produce the thin, outwardly tapering side slitter with its beveled edge 22 and cutting edge. There is a clearance portion 54 between the depth gage and the forward edge of the slitter. Rear edge 55 of the depth gage slopes forwardly and inwardly at a substantially greater angle to the pitch line than that at which the forward face 28 slopes rearwardly and inwardly relative to the pitch line of the chain, an excellent angle between the forward face 28 to the pitch line being about 45° and an excellent angle between the rear edge 55 and the pitch line being about 65°. The deep, wide gullet 56 is formed behind rear edge 57 of the slitter and extends rearwardly under most of the top plate 24, the rear edge 57 being substantially normal to the pitch line and being midway between a line 58 (FIG. 3) joining the centers of the rivet holes 38 and lying on the pitch line of the saw chain. If desired, the edge 57 may be sloped somewhat forwardly proceeding inwardly from outer cutting point 59.

The side face 20 (FIG. 5) of the side slitter 16 slopes laterally inwardly slightly relative to the plane of the body 36 so that the cutting edge 18 is the extreme laterally outward portion of the link, an angle of between 3¾° and 4¼° between the face 20 and the body 36 being excellent. The cutting edge 18 extends, as illustrated in FIG. 2, forwardly and slightly laterally inwardly from the point 59, and is just slightly, but completely laterally, outside the edge 32 of the top plate 24. The angle between the cutting edge 18 (FIG. 3) of the side slitter 16 and the pitch line of the saw chain is kept rather small so that the edge 18 and the point 59 predominantly slice during the sawing action, an angle of 30° between the cutting edge 18 and the pitch line being optimum. The top plate 24 (FIGS. 2, 3 and 4) lies in a plane tilted slightly rearwardly proceeding laterally inwardly from the side edge 32 thereof so that the cutting edge 26 of the top plate extends slightly rearwardly from its laterally outward end 60 and also extends slightly radially inwardly relative to the pitch line of the saw chain from its end 60, as best shown in FIG. 3. A tip 61 of the depth gage 14 is formed at the juncture of the edge 55 and a top surface 62 and is the highest point and the most effective portion of the depth gage during sawing. The tip 61 is positioned forwardly of the forward one of the rivet holes 38 and substantially farther from a line 63 perpendicular to the line 58 than the cutting edge 26 is positioned rearwardly from the line 63. This causes the tip 61 to be substantially lower or farther radially inward than are tip 59 of the cutting edge 18 of the side slitter 16 and the cutting edge 26 of the top plate 24, when the cutter link saw chain is sharpened by bringing an abrasive member (not shown) into contact with the surface 62, the tip 59 and the surface 30 as the tips of these outwardly projecting elements are advanced by a sprocket of a chain saw (not shown) along an arc 64 centered on the sprocket. Also, since the tip 59 is always substantially closer to the line 63 than is the edge 26, the tip 59 is always higher or farther radially outwardly than is the cutting edge 26 of the top plate 24 so that the depth of the side cut of the kerf is always slightly deeper than the cut of the kerf bottom which is effected by the raker cutting edge 26, which permits the raker cut to be effected very smoothly and with a minimum of power.

After many sharpenings of the saw chain 10, the tip 61 of the depth gage moves forwardly, the cutting edge 26 of the top plate 24 moves rearwardly at a lesser rate and the tip 59 of the cutting edge 18 moves forwardly, the tip 59 staying higher than the edge 26 and the tip 61 and the edge 26 staying higher than the tip 61 of the depth gage throughout the useful life of the saw chain. As the tip end of the slitter tooth is ground down radially inwardly by the sharpening, a thin, triangular land is formed, and after each group of several sharpenings, the edge 57 may be hand filed forwardly just enough to remove the land or most of it. In FIG. 6, one of the teeth 12 is shown after many sharpenings, and while still in efficient sawing condition, area 66 having been removed from the side slitter 16 by the many power top sharpenings and by the occasional manual filings of the edge 17. The laterally outside face of the depth gage 14 is just laterally inside the cutting edge 18 of the side slitter 16.

In a sawing operation, the saw chain 10 is advanced toward the right as viewed in FIG. 1. The outer end portions of the slitting edges 18 cut into the wood being sawed and the rakers 24 then come along and cut out the kerf but not so deeply as the side cuts effected by the slitting edges 18. Since the faces 20 and 28 of the side slitter and top plate and the side edges 32 and 34 of the top plate are chromed and substantially harder than the sheet metal forming the top plate and the side slitter, the slitting edge 18 and the cutting edge 26 (including its ends) are formed primarily of the harder chrome so as to be somewhat self-sharpening. Lines 68 and 69 (FIG. 2) indicate the sides of a kerf being sawed by the saw chain.

EMBODIMENT OF FIGURES 7 TO 11

A saw chain 70 forming an alternate embodiment of the invention is identical to the saw chain 10 except for the construction of side slitters 76 and depth gages 74 of allochiral cutter links 71 and 72. The side slitters 76 are continuous with the depth gages 74, and cutting edges 78 form arcuate continuations of arcuate top surfaces 92 of the depth gages. The links 71 and 72 are formed from one-piece sheet metal blanks of uniform thickness, and each side slitter 76 is formed by pushing it laterally out of the plane of a body 86 and out of the plane of the depth gage 74 and then grinding off material 79 (FIG. 9) to make the slitter thin and tapered. A beveled edge 82 then is formed by grinding to form the cutting edge 78.

The depth gage 74 is positioned forwardly of a forward rivet hole 87 and in the body 96. A top plate or raker 84 is positioned farther rearwardly of a line 85 perpendicular to and passing through the midpoint 89 of a line 91 joining the centers of the forward rivet hole 87 and a rear rivet hole 88 than is the depth gage 74 positioned forwardly of the line 85. Point 99 of the edge 78 is positioned much nearer to the line 85 than is cutting edge 86 of the top plate. As the saw chain is sharpened by operating the chain saw (not shown) to drive the saw chain around the drive sprocket of the chain saw and bringing an abrasive sharpening member (not shown) into contact with outer or top surfaces 92 and 90 of the depth gage 74 and the top plate 84, respectively, and the cutting edge 78 these outer or tip surfaces of these projecting elements 74, 76 and 84 are ground to lie in an arc 101 centered on the axis of the sprocket. The cutting edge 86 is sharpened, and the surface 92 is ground down to provide the optimum height differential of the depth gage relative to the top plate and the side slitter. This also grinds down slightly the cutting edge 78 and surface 103 is then hand filed to make the cutting edge 78 sharp. Rear edge 85 of the slitter 76 is beveled and sloped slopes forwardly and inwardly from the point 99 at an angle of about 55° to the pitch line of the saw chain. Edge 105 of the top plate also is at an angle of about 55° to the pitch line of the saw chain. Rear edge 107 of the depth gage is at an angle of about 60° to the pitch line of the saw chain. Laterally outward face 104 of the slitter 76 and forward face 106 and side edges 108 and 109 of the top plate are chrome plated so that the cutting edges 78 and 86 tend to be self-sharpening from use thereof. A long, deep gullet 107 is provided for chip clearance. A shank portion 97 supporting the top plate is offset somewhat. Similarly, shank portions 93 and 95 of the depth gage and side slitter respectively extend radially outwardly and laterally toward the sidewall of the kerf.

The cutting edge 78 makes a sharp angle with the pitch line of the saw chain, preferably being about 10° so that a predominantly slicing action at the sidewall of the kerf is effected by the edge 78 during the sawing. The point 99 at the trailing end of the edge 78 is higher than the edge 86 of the top plate 86 so that the top plate is always raking kerf material completely severed at the side of the kerf. The edge 103 preferably is at an angle of about 45° relative to face 104.

EMBODIMENT OF FIGURES 12 TO 14

A low profile, top sharpening saw chain 110 forming an alternate embodiment of the invention includes allochiral cutter links 111 and 112, chain retainer links 113 having depth gages 115, allochiral side-slitting links 116 and 117 and U-shaped wire side links 119 swaged or staked at 121 to secure them to the side links 113, the links just described forming one complete sequence of the saw chain as arranged in the order shown in FIG. 1. The links 111 and 112 are generally like the links 11 and 12 (FIG. 1), but are center rather than side links and have center drive portions 144, center slitters 123, center depth gages 114 and top plates or rakers 124, with gullets 156 positioned between the slitters 123 and the top plates 124 and clearance portions 154 positioned between the slitters 117 and the depth gages 114. The side-slitting links 116 and 117, while serving to slit at the sides of the kerf, are actually center links, and have center drive portions 145 adapted to be engaged by the teeth of a drive sprocket of a chain saw on which the saw chain is mounted.

Each of the cutter links 111 and 112 has a beveled edge 122 defining a slitting edge 118 with a chrome plated side surface 120 and has a tip point 159. The depth gages 114 have uppermost tips 161 at the trailing ends of abradable, arcuate top surfaces 162. The tips 161 are positioned forwardly of the front ones of rivet holes 138 in bodies 136 of the links 111 and 112. The saw chain is of uniform pitch, and is adapted to be sharpened when driven by the chain saw around a drive sprocket and having an abrasive member brought into contact with the tip portions of the outwardly projecting elements thereof. As each cutter link 111 is so sharpened, the surface 162, the tip 159 and top beveled edge surface 130 of the top plate 124 travel along an arcuate path indicated by arcuate line 164 (FIG. 13) centered on the axis of rotation of the drive sprocket, and the surfaces 130 and 162 and the point 159 are ground and sharpened by the abrasive sharpening member to sharpen cutting edge 126 and the point 159 and grind down the top plate 124, slitter 123 and the depth gage 124 to the desired heights. Forward face 128 of the top plate 124 is chrome plated so that the cutting edge 126 tends to remain sharp. The links 111, 112, 113, 116 and 117 are composed of sheet metal of relatively high carbon steel, which, of course, is substantially softer than the chrome plating of the faces 120 and 128 and laterally outward side faces 131 of the side slitting links 116 and 117. The other portions which are chrome plated are the portions of the links which project into a groove 133 of a saw bar 135 of the chain saw, and the links 119 are chrome plated so that surfaces 137 and 139, which ride on lands 141 of the saw bar, are hard and wear resistant.

The position of the tip 161 of each depth gage 114 is defined by the surface 162 and a forwardly and inwardly sloping trailing edge 155 (FIG. 13). The position of the point 159 is determined by the intersection of the edge 118 with the line 164, a sloping face 167 being filed by hand occasionally, after several top sharpenings, to increase the sharpness of the point 159. The position of the cutting edge 126 is determined by the intersection of the forward face 128 and the top edge 130, which lies along the line 164. The slopes and positions of the top plate 124, the cutting edge 118 and the trailing edge 155 are such that, as the link is top sharpened as it travels around the drive sprocket, the tip 161 of the depth gage 114 is always farther forwardly of a line 163, which is perpendicular to and passing through the midpoint of a line 158 joining the centers of the rivet holes 138, than is the cutting edge 126 rearward of the line 163. This causes the cutting edge 126 to be higher than the tip 161. Also, the point 159 of the cutting edge 118 is always nearer to the line 163 than is the cutting edge 126 so that the point 159 is always higher than the cutting edge 126.

The depth gages 114 and the center slitters 123 (FIG. 12) are offset slightly relative to the bodies 136 of the links 111 and 112 by shank portions 171 so that faces 120 of the center slitters 123 and side faces 147 of the depth gages 114 lie in a plane lying in the center of the saw chain.

The side-slitting links 116 and 117 have side slitters 180 carried by laterally offsetting shanks 181 offsetting the slitters 180 from bodies 182 of the links 116 and 117. The slitters 180 have forward slitting edges 183 formed by the intersections of beveled forward edges 184 and the chrome plated side faces 181. Deep gullets 185 like the gullets 156 are formed between the slitters 180 and depth gages 186 which are of the same shape as the depth gages 114 and are in the same positions relative to forward ones of the rivet holes 187 of the links 116 and 117 as the positions of the depth gauges 114 relative to the forward ones of the rivet holes 138 of the links 111 and 112. Hence, the heights of the depth gages 186 are always of the same height as that of the depth gages 114, and are lower than the heights of outer points formed by the outermost ends of the cutting edges 183 and top surfaces 188 of the slitters 180, the edges 183 being steeply sloping and always closer to a line 189, which is perpendicular to a line 190 joining the centers of the rivet holes 187 and passing through the midpoint of the line 190, than are tips 191 of the depth gages 186. Thus, when the links 116 and 117 are top sharpened, in which their outermost extremities travel along an arcuate line 192 centered on the drive sprocket, the slitting edges 183 extend outwardly beyond the tips 191 of the depth gage. Thus, a height differential is created between the depth gages 186 and the slitters 180.

The links 119 have bases 193 joining straight end portions 194 perpendicular thereto, the bases being arcuate to provide clearance for circular flanges of the drive sprocket (not shown). The end portions project sufficiently far beyond the retainer links 113 to provide good bearing surfaces on the edges 141 (FIG. 14) of the saw bar and the circular flanges of the drive sprocket.

The retainer links 113 serve as side links in engaging the bodies 136 and 182 of the links 111, 112, 116 and 117 but are thin and serve as center links in that they project with the bodies 136 and 182 into the groove 133 in the saw, inwardly projecting forward nose portions 197 aiding the grinding action. The depth gages 115 are identical in shape to the depth gages 114 and 186, and are positioned forwardly of forward ones of rivet holes 198 of the links 113 the same distance that the depth gages 114 and 186 are positioned forwardly of the rivet holes 138 and 187, respectively. Hence, the height of the depth gages 115 is always the same as that of the depth gages 114 and 186. The depth gages 115 and 186 are not offset from the bodies of their respective links.

In the operation of the saw chain 110, the slitters 180 slit along the centerline of the kerf bottom, the cutting edges 183 being sloped forwardly and outwardly, as limited by the depth gages 186. The slitters 123 slit the sides of the kerf bottom to the same depth as that to which the slitters 180 slit the center, the depth gages 114 limiting the depth of cut. The rakers 124 then cut out the kerf halves but not quite to the depth to which the several slitters slit the sides and centers. The depth gages 115 also limit the depth to which the slitters 180 cut, the gages being very close to these slitters. By slitting deeper than the raking and by slitting both the center and the sides so that two separated kerf halves are formed, chip removal is facilitated, and the power for driving the chain, the heat generated and wear on the chain are minimized. By having the rivet structures (the U-shaped wire links 119) serve as the elements to engage the lands 141 of the saw bar 135, the saw chain has a low profile so that its stability is maximized. The saw chain 110 is completely power sharpenable.

The rakers 24, 84 and 124 are essentially chisellike, and, since each raker has no vertical slitter directly attached thereto, the raker can and does have the hard chrome plating surface on the bottom face and around both side edges so that absolutely no hand filing is required to maintain the cutting edges thereof in optimum cutting condition.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:

1. In a top sharpening saw chain:
   a cutter link of one-piece, formed sheet metal having a body provided with rivet holes, a rearwardly positioned, steeply sloped top raker plate having an outer, forward edge surface defining with the forward face of the raker plate a cutting edge and a slitter in front of the raker plate and having a beveled forward edge surface defining a slitting edge with one side face of the slitter and adapted to be sharpened by abrading the tip end of the slitter;
   the beveled forward edge surface of the slitter being positioned closer to a transverse line extending perpendicularly to a line joining the centers of the rivet holes and at the midpoint of the line joining the centers of the rivet holes than is the cutting edge of the raker plate;
   the cutter link including a depth gage having a rear edge positioned in front of the slitter and farther forwardly of said transverse line than is the cutting edge of the raker plate positioned rearwardly of said transverse line; and
   the slitting edge of the slitter extending forwardly and inwardly at an acute angle relative to the pitchline of the saw chain.

2. In a top sharpening saw chain:
   a cutter link of one-piece, formed sheet metal having a body provided with rivet holes, a rearwardly positioned, steeply sloped top raker plate having an outer, forward edge surface defining with the forward face of the raker plate a cutting edge and a slitter in front of the raker plate and having a beveled forward edge surface defining a slitting edge with one side face of the slitter and adapted to be sharpened by abrading the tip end of the slitter;
   the beveled forward edge surface of the slitter being positioned closer to a transverse line extending perpendicularly to a line joining the centers of the rivet holes and at the midpoint of the line joining the centers of the rivet holes than is the cutting edge of the raker plate; and
   the slitting edge of the slitter extending forwardly and inwardly from the outer end thereof.

3. The top sharpening saw chain of claim 2 wherein the slitter is at one side of the path of the chain for slitting the side of the kerf.

4. The top sharpening saw chain of claim 3 wherein the length of the cutting edge of the raker plate is sufficient to cut only slightly over one-half of the width of the kerf and one end of the cutting edge is positioned near one side of the kerf.

5. The top sharpening saw chain of claim 4 wherein the cutting edge of the raker plate is positioned at the same side of the kerf as the slitter.

6. The top sharpening saw chain of claim 2 wherein the slitter is at the center of the path of the chain for slitting the center of the kerf bottom.

7. The top sharpening saw chain of claim 6 wherein the length of the cutting edge of the raker plate is sufficient to cut only about one-half of the width of the kerf and the cutting edge is substantially completely at one side of the slitter.

8. The top sharpening saw chain of claim 6 wherein the cutter link is a center drive link and includes a center drive portion adapted to be drivingly engaged by a sprocket of a saw chain.

9. The top sharpening saw chain of claim 6 including side slitting links for slitting the sides of the kerf.

10. The top sharpening saw chain of claim 1 wherein the forward edge of the slitter and the rearward edge of the depth gage form a gulletlike clearance portion.

11. The top sharpening saw chain of claim 2 wherein the slitter decreases in thickness proceeding outwardly from its inner portion.

12. The top sharpening saw chain of claim 2 wherein the slitter is offset laterally from the body of the link and is tapered in thickness from thinner at its outer portion to thicker at its inner portion.

13. The top sharpening saw chain of claim 2 wherein the cutter link includes a depth gage positioned forwardly of the slitter and farther from said transverse line than the cutting edge of the raker plate is positioned rearwardly of said transverse line.

14. The top sharpening saw chain of claim 13 wherein the slitting edge of the slitter merges into the top surface of the depth gage.

15. The top sharpener of claim 13 wherein the slitting edge and a rear edge of the depth gage define a notchlike clearance opening.

16. In a top sharpening saw chain:
a plurality of allochiral cutter links;
each cutter link being of one-piece, formed sheet metal and having a body having front and rear pivot portions;
each of the cutter links including a steeply sloped top raker plate having an outer, forward edge surface defining with the forward face of the raker plate a cutting edge;
each of the cutter links also including a slitter spaced along the link from the raker plate with a gullet like clearance portion therebetween and having a beveled forward edge surface defining a slitting edge with one side face of the slitter and adapted to be sharpened by abrading the tip end of the slitter;
each slitting edge extending inwardly at an acute angle relative to the pitchline of the saw chain; and
the beveled forward edge surface of the slitter being positioned closer than the cutting edge of the raker plate to a transverse line extending perpendicularly to and through the midpoint of a line joining the centers of the pivot portions of the link.

17. The top sharpening saw chain of claim 16 wherein the raker plate is positioned to the rear of the slitter.

18. The top sharpening saw chain of claim 17 wherein the outer end of the slitting edge is substantially centered longitudinally of the link.

19. The top sharpening saw chain of claim 18 wherein the slitting edges of the cutter links are at the sides of the kerf and each of the cutting edges extends across about one side half of the kerf bottom.

20. The top sharpening saw chain of claim 19 wherein each of the cutter links includes a depth gage positioned forwardly of said transverse line farther than the cutting edge of the raker plate is positioned rearwardly of said transverse line.

21. The top sharpening saw chain of claim 17 wherein the slitting edges of the slitters are at the center of the kerf, including a plurality of allochiral sideslitting links.

22. The top sharpening saw chain of claim 21 wherein the cutting links are provided with forwardly positioned depth gages.

23. The top sharpening saw chain of claim 16 wherein the slitting edge extends forwardly and inward inwardly from the outer end thereof.

24. The top sharpening saw chain of claim 17 wherein the slitting edge extends forwardly and inwardly from the outer end thereof.